M. GOLDSTONE.
SHIPPER MECHANISM.
APPLICATION FILED AUG. 20, 1914.
1,182,008.
Patented May 9, 1916.
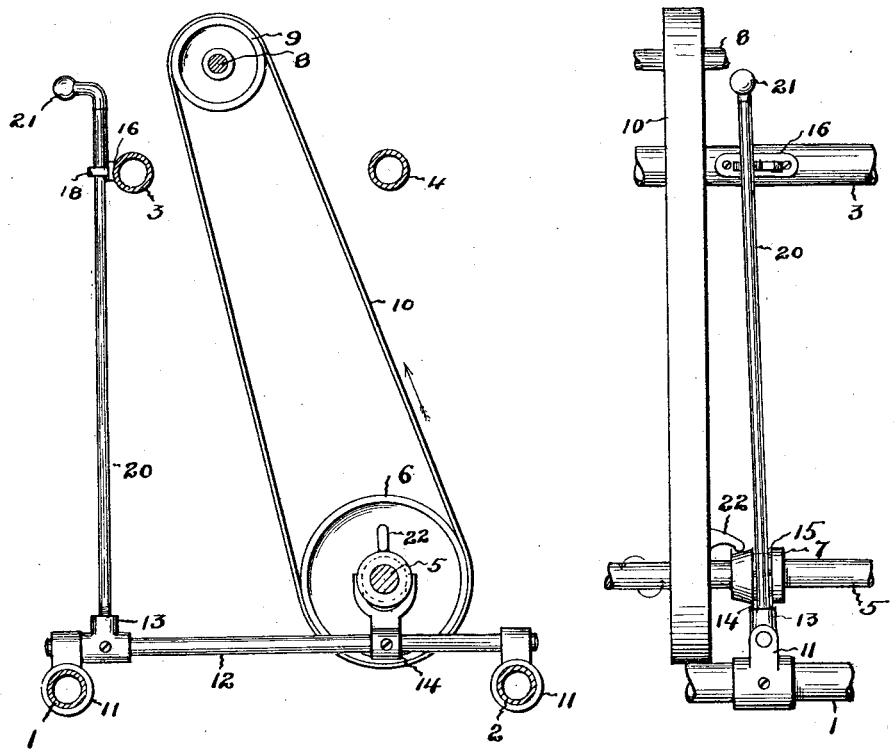
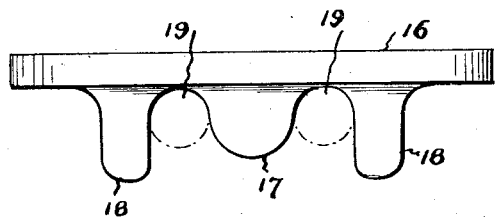
WITNESSES
INVENTOR

UNITED STATES PATENT OFFICE.

MAX GOLDSTONE, OF NEW HAVEN, CONNECTICUT.

SHIPPER MECHANISM.

1,182,008. Specification of Letters Patent. Patented May 9, 1916.

Application filed August 20, 1914. Serial No. 857,764.

*To all whom it may concern:*

Be it known that I, MAX GOLDSTONE, a citizen of the United States, residing at New Haven, in the county of New Haven and State of Connecticut, have invented new and useful Improvements in Shipper Mechanism, of which the following is a specification, reference being had therein to the accompanying drawing.

My invention relates to new and improved shipper mechanism, having for its object, among other things, to provide a simple device that will automatically lock itself at each of its extreme positions, may be produced at the minimum cost, and applied to any type of machinery having a manually operated make and break mechanism connected therewith.

To these and other ends, my invention consists in the shipper mechanism, having certain details of construction and combinations of parts, as will be hereinafter described and more particularly pointed out in the claim.

Referring to the drawings, in which like numerals of reference designate like parts in the several figures, Figure 1 is an elevation of my improved mechanism as applied to a machine, only the essential portions of which, so far as they relate to the present invention, being shown; Fig. 2 is a front view thereof; and Fig. 3 is an enlarged view of the catch plate.

As shown herein my mechanism is utilized for the purpose of operating a clutch, but its application is not limited thereto, it being adapted for shifting a belt, or other analogous purpose, if desired.

The machine shown in the drawing is provided with rigid bars 1, 2, 3 and 4, a rotary shaft 5, upon which there is a fixed pulley 6 and a sliding clutch block 7, an auxiliary shaft 8, a pulley 9 thereon, and a belt 10 connecting the pulleys 6 and 9.

My improved attachment consists essentially of the journal blocks 11 fixed to the bars 1 and 2, and in which is journaled the rock shaft 12 having fixed thereon the head block 13 and the yoke 14, the arms of which enter the recess 15 in the block 7 and move the same axially upon the shaft 5 during the rotation of the shaft 12.

Fixed to the rod 3 is a catch plate 16, having a central lug 17 and companion lugs 18 near each end thereof with notches 19 therebetween. Threaded into the head block 3 is a rod 20 having a handle 21 in the upper end thereof, and the diameter of which is substantially the same as the diameter of the notches 19 in the catch plate. The relative positions of the rod 20 and yoke 14 are such that when the rod 20 is in one of the notches 19, the clutch block 7 is in such engagement with the arm 22 upon the pulley 6, as to impart the rotary movement of the block 7 to the pulley 6, and through the belt 10 and pulley 9 to the shaft 8, and when in the other notch 19 the yoke 14 and block 7 are moved to release the contact arm 22 and break the connection therebetween so that the pulley 6 remains stationary. With this device the make and break connection between the shaft 5 and pulley 6 is quickly and easily made and in either position is locked against accidental movement by the engagement of the rod 20 with one of the notches in the catch plate 16, the rod 20 swinging outwardly sufficiently to pass over the lug 17.

In minor details my invention may be considerably modified from that herein shown, and I would therefore have it understood that I do not limit myself to the exact construction herein shown and described, but claim all that falls fairly within the spirit and scope of my invention and the appended claim.

Having described my invention, what I claim as new and desire to secure by Letters Patent, is:—

In a device of the character described, the combination with a pair of parallel members; of a shaft substantially parallel therewith; a clutch block slidably mounted upon said shaft; a journal block adjustably fixed upon each of said parallel members; a rock shaft journaled in said journal blocks; a head block adjustably fixed on said rock shaft; a yoke having engagement with said clutch block, adjustably fixed on said rock shaft; a rod substantially parallel with said shaft; a catch plate fixed to said rod, having stop lugs near its outer ends, a lug therebetween of less height than said stop lugs, and a notch between said lug and each of said stop lugs; and a rod fixed in said head block and having engagement with said catch plate, said rod being sufficiently flexible to ride over said lug without impairing its fixed relation with said head block.

In testimony whereof I affix my signature in presence of two witnesses.

MAX GOLDSTONE.

Witnesses:
George E. Hall,
Florence H. Monk.

Copies of this patent may be obtained for five cents each, by addressing the "Commissioner of Patents, Washington, D. C."